(12) United States Patent
Brown

(10) Patent No.: US 7,077,624 B2
(45) Date of Patent: Jul. 18, 2006

(54) VEHICLE COOLING FAN SHROUD WITH AN ARTICULATABLE PORTION

(75) Inventor: Daniel J. Brown, Northville, MI (US)

(73) Assignees: Custom Molders, Inc., Durham, NC (US); Labelle-Suomela, Inc., Redford Township, MI (US)

( * ) Notice: Subject to any disclaimer, the term of this patent is extended or adjusted under 35 U.S.C. 154(b) by 311 days.

(21) Appl. No.: 10/777,402

(22) Filed: Feb. 12, 2004

(65) Prior Publication Data

US 2005/0180848 A1    Aug. 18, 2005

(51) Int. Cl.
*F01D 25/14* (2006.01)
(52) U.S. Cl. .................... 415/126; 415/214.1; 415/223
(58) Field of Classification Search ............... 29/889.1, 29/889.21, 889.22, 889.3; 415/126, 213.1, 415/214.1, 220, 221; 123/41.49
See application file for complete search history.

(56) References Cited

U.S. PATENT DOCUMENTS

| | | | | |
|---|---|---|---|---|
| 4,353,680 A | * | 10/1982 | Hiraoka et al. | 415/222 |
| 4,741,669 A | * | 5/1988 | Shimokawabe | 415/223 |
| 5,410,992 A | * | 5/1995 | Hunt et al. | 123/41.49 |

* cited by examiner

*Primary Examiner*—Edward K. Look
*Assistant Examiner*—Devin Hanan
(74) *Attorney, Agent, or Firm*—Carlson, Gaskey & Olds

(57) ABSTRACT

A vehicle cooling fan shroud includes a barrel portion which surrounds a cooling fan and is integrated with a substantially rectilinear shroud portion which surrounds a radiator. The barrel portion includes a first portion and a second portion pivotally attached to the first portion. By pivoting the second portion relative the first cylindrical portion and into the rectilinear shroud portion, the shape of the fan shroud is changed to assist insertion of the fan shroud into an engine compartment.

15 Claims, 3 Drawing Sheets

VEHICLE COOLING FAN SHROUD WITH AN ARTICULATABLE PORTION

BACKGROUND OF THE INVENTION

The present invention relates to a cooling fan shroud for a vehicle, and more particularly to a cooling fan shroud having a movable portion to assist installation within a vehicle engine compartment.

Vehicles with liquid cooled engines typically include an engine cooling system which mount an engine cooling heat exchanger (radiator) at the front of the engine compartment, just behind the bumper and grille, so as to take advantage of the ram air effect at higher vehicle speeds. At lower vehicle speeds, an engine cooling fan draws air through the radiator. The fan is generally mounted to a support shroud that both physically secures the fan to the radiator, and which also surrounds the fan to confine and direct air through the radiator.

The design of these engine cooling systems is often constrained by flow and thermal requirements, design of related systems and equipment, and size and space constraints within the engine compartment. Installation of the cooling fan shroud may be relatively difficult to achieve in a manufacturing environment. As such, conventional cooling fan shrouds are often manufactured of multiple portions. The fan shroud portions are separately inserted around previously installed components within the engine compartment then assembled together therein.

Although effective, conventional multi-portion fan shrouds result in an increase in the labor required during assembly. The fan shroud portions must also be assembled together within the engine compartment which may be difficult due to space constraints which are further limited once the fan shroud portions are located in the engine compartment. Moreover, additional inventory control may be required to assure that each portion is available during the assembly process.

Accordingly, it is desirable to provide a cooling fan shroud that is readily assembled into an assembly compartment yet avoids final assembly of multiple fan portions therein.

SUMMARY OF THE INVENTION

The vehicle cooling fan shroud according to the present invention includes a barrel portion that surrounds a cooling fan integrated with a substantially rectilinear shroud portion which surrounds a radiator. The barrel portion includes a first portion and a second portion pivotally attached to the first portion. The second portion is movable about a pivot axis to selectively collapse the second portion into the rectilinear shroud portion.

By pivoting the second portion relative the first cylindrical portion and into the rectilinear shroud portion, the shape of the fan shroud is changed to assist insertion of the fan shroud into the engine compartment. Once located within the engine compartment, the second portion is moved to a final position which defines the final fan shroud configuration.

The present invention therefore provides a cooling fan shroud which is readily assembled into an assembly compartment yet avoids final assembly of multiple fan portions therein.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
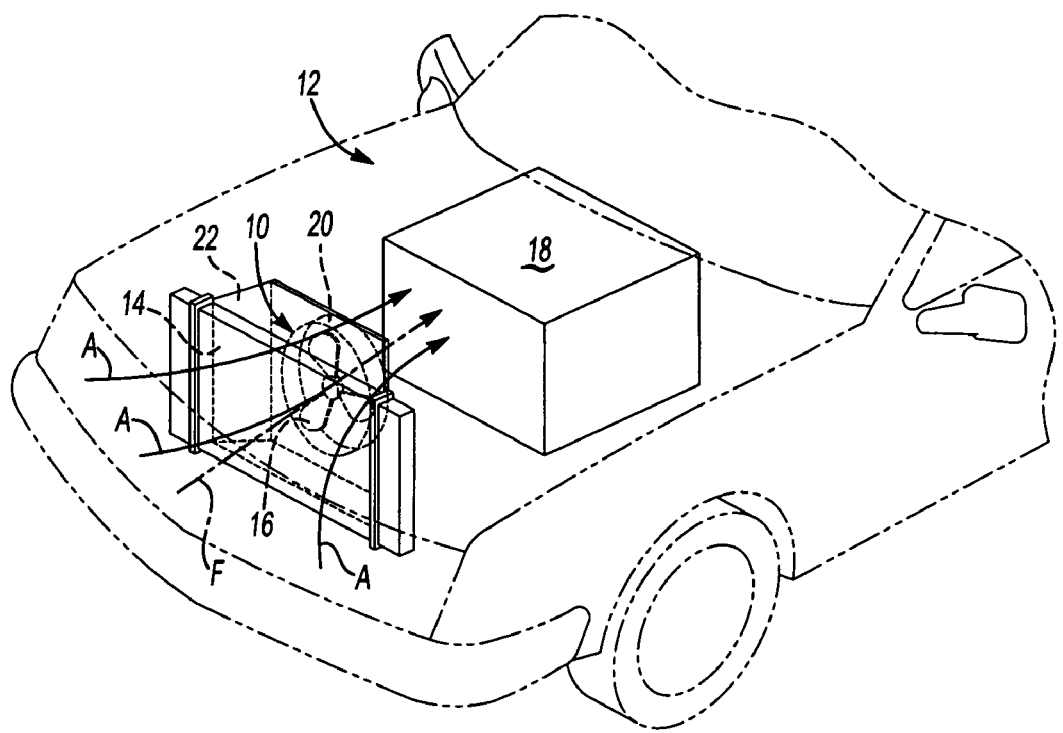
FIG. 1 is a general perspective view a vehicle fan shroud located within an exemplary vehicle embodiment.

FIG. 1 illustrates a general perspective view of a fan shroud 10 mounted within a vehicle engine compartment 12. The fan shroud 10 is positioned adjacent a radiator 14 which is typically mounted forward of, or partially within the fan shroud 10. A cooling fan 16 is mounted between a vehicle engine (illustrated schematically at 18) and the radiator 14. The fan shroud 10 is mounted adjacent a rear face of the radiator 14 in a position to concentrically surround the cooling fan 16. The cooling fan 16 rotates about axis F to draw ambient air through the radiator 14 in a direction schematically illustrated by arrows A to flow over engine 18.

Typically, the cooling fan 16 is of a smaller diameter than the radiator 14 such that the discharge side of the fan shroud 10 which surrounds the cooling fan 16 includes a substantially cylindrical barrel portion 20. The cooling fan 16 is mounted for rotation about the axis of rotation F and is centrally positioned within the barrel portion 20. The barrel portion 20 which surrounds the cooling fan 16 is integrated with a substantially rectilinear shroud portion 22 which surrounds the radiator 14. It should be understood that various shapes which surround or partially surround the radiator 14 will benefit from the present invention.

Figure 2:
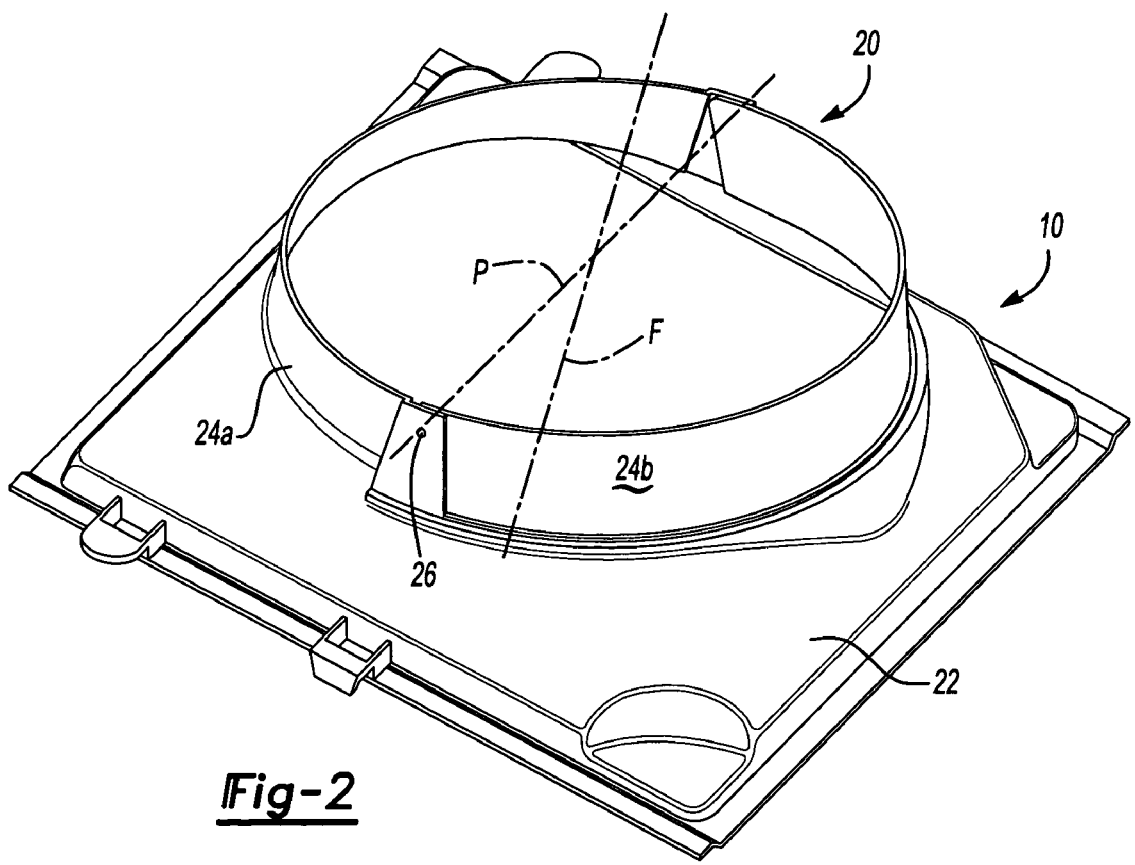
FIG. 2 is an expanded perspective view of the fan shroud in a first position.

Referring to FIG. 2, the barrel portion 20 is defined about axis F. The barrel portion 20 preferably includes a first portion 24A and a second cylindrical portion 24B pivotally attached to the first cylindrical portion 24A. The first portion 24A is preferably at least partially integrally molded with the rectilinear shroud portion 22.

Figure 3:
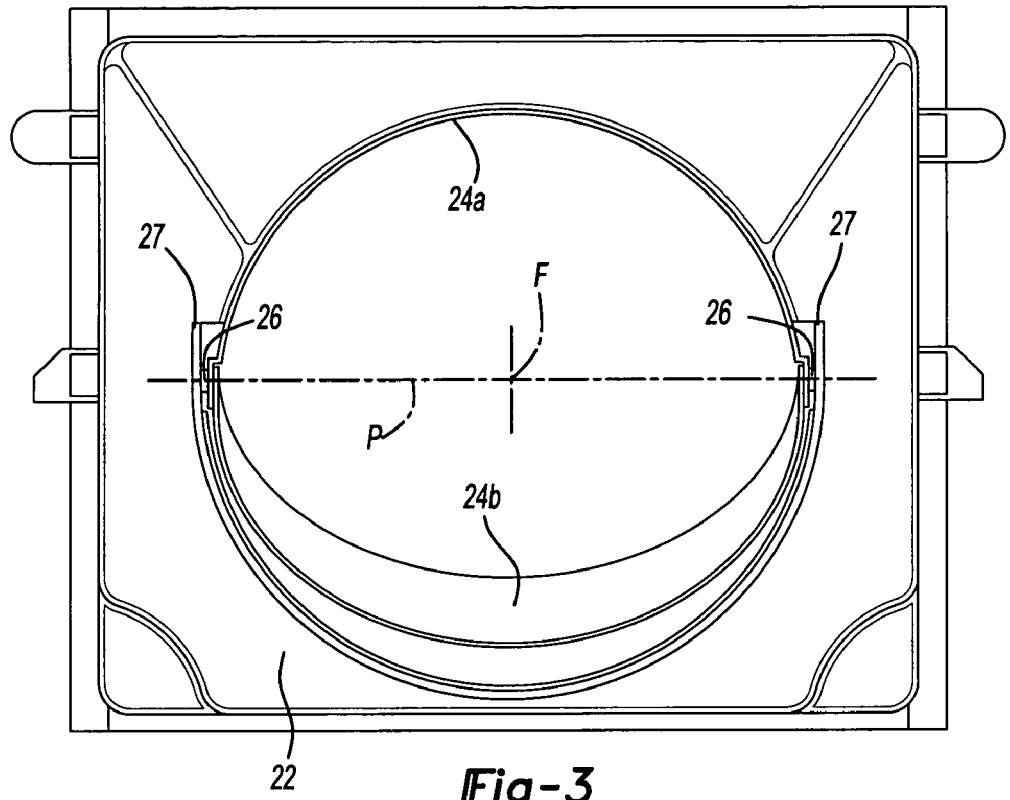
FIG. 3 is an expanded perspective view of the fan shroud in a second position.

The second portion 24B includes pivot pins 26 which fit within pivot apertures 27 formed within the first cylindrical portion 24A (FIG. 3). The pivot pins 26 and the pivot apertures 27 define a pivot axis P. It should be understood that the pivot axis P may be located anywhere within the fan shroud depending upon the component arrangement within the engine compartment (FIG. 1).

Figure 4:
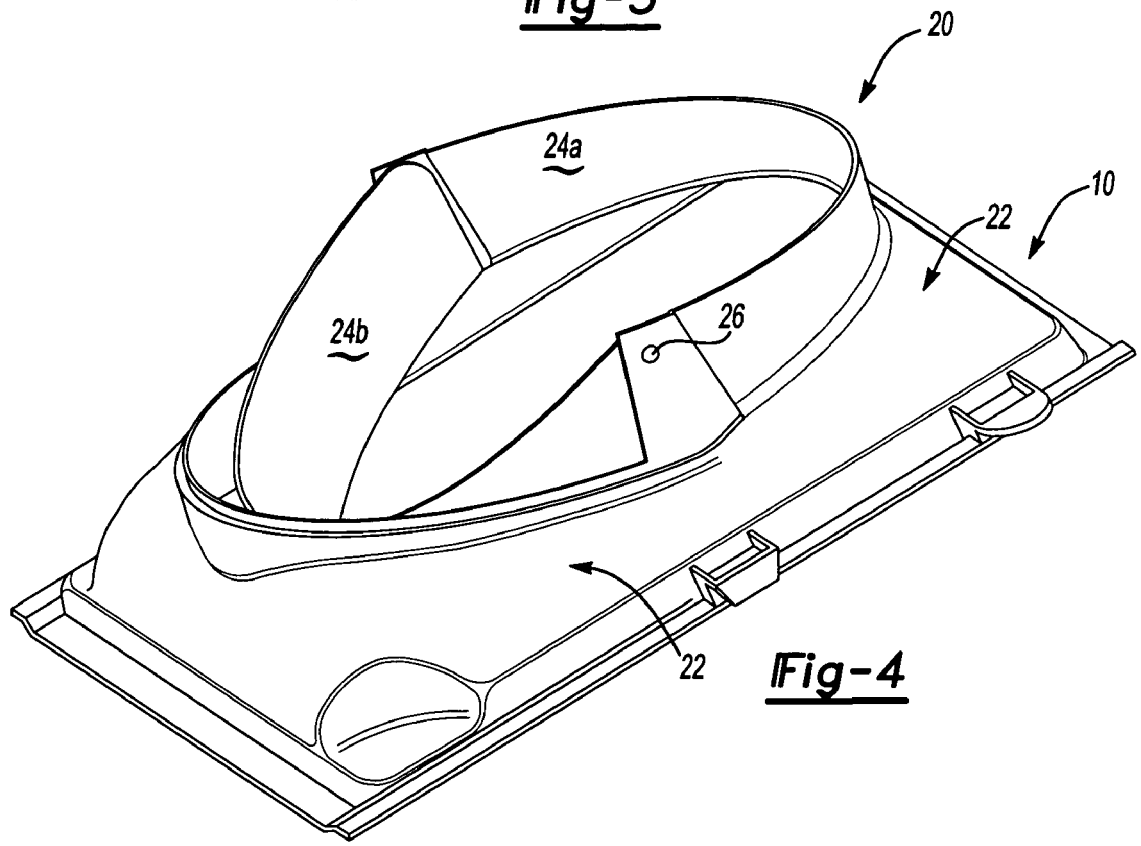
FIG. 4 is an expanded perspective view of the fan shroud in the first position.
Figure 5:
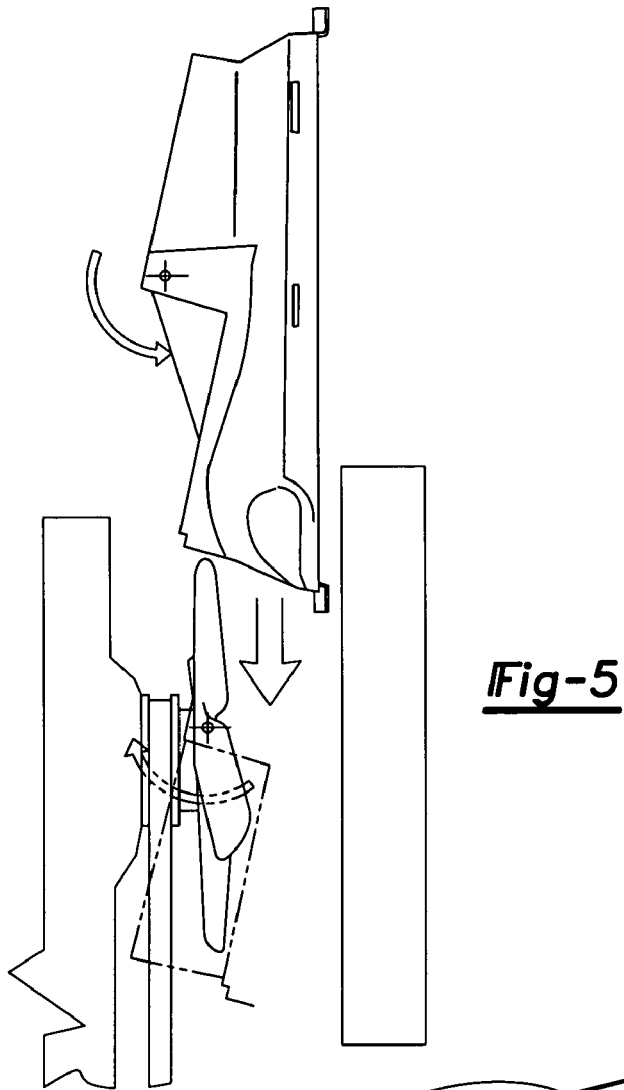
FIG. 5 is an expanded perspective view of the fan shroud in a second position.

The second portion 24B is movable about the pivot axis P to selectively collapse the second cylindrical portion 24B into the rectilinear shroud portion 22 (FIGS. 4 and 5). By pivoting the second portion 24B relative the first cylindrical portion 24A and into the rectilinear shroud portion 22, the shape of the fan shroud 10 is changed to assist insertion into the engine compartment 12 (FIG. 1). It should be understood that the location of the pivot axis P is not limited to that disclosed in the illustrated embodiment. Any pivot axis P location which simplifies installation of the fan shroud into a particular engine compartment will benefit from the present invention. Once located within the engine compartment 12, the second portion 24B is returned to a final position which defines the installed fan shroud 10 configuration.

Figure 6:
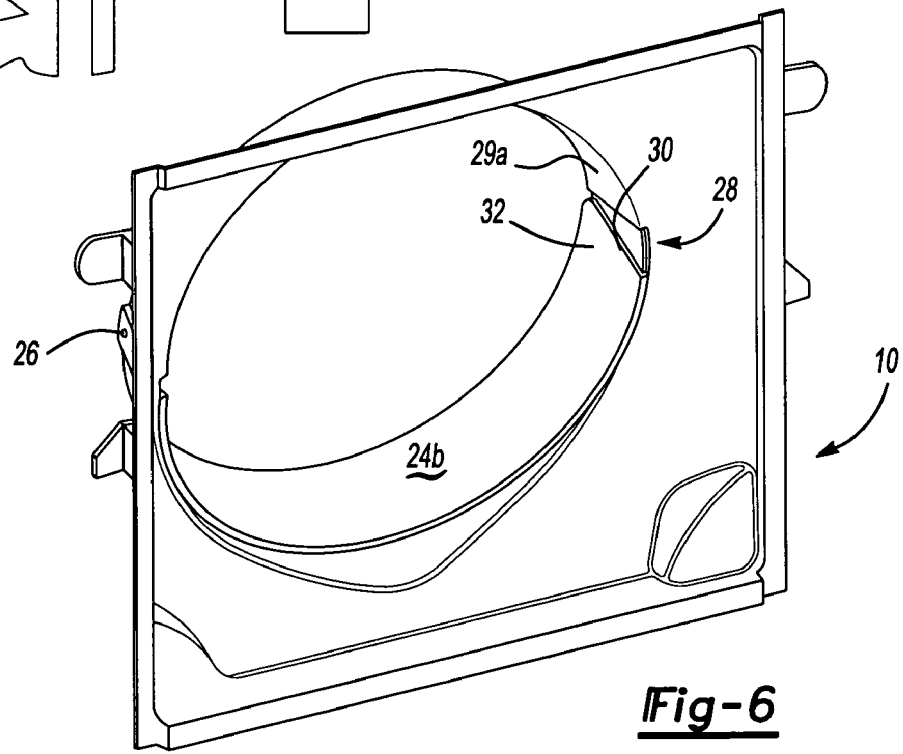
FIG. 6 is an expanded perspective view of the fan shroud in a first position.

Referring to FIG. 6, once the fan shroud 10 is mounted within the vehicle and the second portion 24B is returned to the final position, the second portion 24B is locked into place. A friction lock 28 is located adjacent the pivot pins 26. The friction lock 28 preferably includes a step 30 formed in the first cylindrical portion 24A which engages an edge 32 of the second portion 24B. The edge 32 generally flexes over the step 30 when the first portion 24A is pivoted relative the second portion 24B (FIG. 5). The pivot pins 26 are of a length to accommodate the inward movement of the second portion 24B as the edge 32 flexes over the step 30 (FIG. 3). When returned to the final position, the second portion 24B returns to the original shape and the edge 32 is trapped adjacent the step 30. That is, the second portion 24B, when returned to the final position, completes the outer perimeter of the substantially cylindrical barrel portion 20 as generally defined by the fixed first portion 24A.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle fan shroud comprising:
    a first portion and a second portion, said second portion pivotable relative said first portion, said second portion pivotable between a first position at least partially within said first portion and a second position generally along an outer periphery defined by said first portion to complete the outer periphery.

2. The vehicle fan shroud as recited in claim 1, wherein said first portion and said second portion comprise a barrel portion which extend from a rectilinear shroud portion.

3. The vehicle tan shroud as recited in claim 2, wherein said second barrel portion pivots relative said first barrel portion.

4. The vehicle ran shroud as recited in claim 2, wherein said barrel portion defines an axis of rotation, said second barrel portion movable relative said first barrel portion about an axis transverse to said axis of rotation.

5. The vehicle fan shroud as recited in claim 1, wherein said first portion comprises a pivot pin and said second portion comprises a pivot pin aperture to receive said pivot pin.

6. The vehicle fan shroud as recited in claim 1, wherein said first portion and said second portion are substantially cylindrical.

7. The vehicle fan shroud as recited in claim 1, wherein said first portion and said second portion comprise a barrel portion which extends from a rectilinear shroud portion, said second portion movable at least partially within said rectilinear portion.

8. The vehicle fan shroud as recited in claim 1, wherein said first and second portion are defined about an axis of rotation, said second portion movable relative said first portion about an axis transverse to said axis of rotation.

9. A vehicle fan shroud comprising:
    a rectilinear shroud portion; and
    a barrel portion extending from said rectilinear shroud portion, said barrel portion comprising a first barrel portion and a second barrel portion, said second barrel portion movable relative said first barrel portion said second barrel portion pivots relative said first barrel portion.

10. A vehicle fan shroud comprising:
    a rectilinear shroud portion; and
    a barrel portion extending from said rectilinear shroud portion, said barrel portion comprising a first barrel portion and a second barrel portion, said second barrel portion movable relative said first barrel portion said barrel portion defines an axis of rotation, said second barrel portion movable relative said first barrel portion about an axis transverse to said axis of rotation.

11. A method of installing a vehicle fan shroud comprising the steps of:
    (1) pivoting a second portion of a fan shroud relative a first portion of the fan shroud;
    (2) mounting the fan shroud within a vehicle engine compartment; and
    (3) pivoting the second portion of the fan shroud relative the first portion of the fan shroud after said step (2).

12. A method as recited in claim 11, wherein said step (1) further comprises:
    pivoting the second portion from a first position to a second position.

13. A method as recited in claim 12, wherein said step (3) further comprises:
    pivoting the second portion from the second position to the first position.

14. A method as recited in claim 12, wherein said step (3) further comprises:
    pivoting the second portion from the second position to an final position.

15. A method as recited in claim 14, further comprises the step of:
    locking the second portion in the final position.

* * * * *

UNITED STATES PATENT AND TRADEMARK OFFICE
CERTIFICATE OF CORRECTION

PATENT NO. : 7,077,624 B2 Page 1 of 1
APPLICATION NO. : 10/777402
DATED : July 18, 2006
INVENTOR(S) : Daniel J. Brown It is certified that error appears in the above-identified patent and that said Letters Patent is hereby corrected as shown below:

Claim 3, Column 3, line 52: "tan" should be --fan--

Claim 4, Column 4, line 55: "ran" should be --fan--

Signed and Sealed this

Twenty-first Day of November, 2006

JON W. DUDAS
*Director of the United States Patent and Trademark Office*